United States Patent [19]
Saladin

[11] 3,915,617
[45] Oct. 28, 1975

[54] MULTI-PART MOLDING PRESS

[76] Inventor: Josef Saladin, Bubenloostrasse 24a, Wil, Sg, Switzerland

[22] Filed: June 11, 1973

[21] Appl. No.: 368,625

[30] Foreign Application Priority Data
June 12, 1972 Germany............................ 2228602

[52] U.S. Cl. ................ 425/501; 425/513; 425/518; 425/521; 425/301; 425/317; 425/324 R; 425/409
[51] Int. Cl.² ........................................ B29C 27/02
[58] Field of Search ........... 425/412, 383, 317, 292, 425/324, 385, 398, 409, 301, 501, 506, 513, 518, 521

[56] References Cited
UNITED STATES PATENTS

| | | | |
|---|---|---|---|
| 2,596,388 | 5/1952 | Elvis .................................... | 425/292 |
| 2,896,555 | 7/1959 | Marcus et al. ...................... | 425/292 |
| 3,172,927 | 3/1965 | Mojonnier ...................... | 425/388 X |
| 3,484,518 | 12/1969 | Ignell .............................. | 425/324 X |
| 3,577,591 | 5/1971 | Ricards et al. ................... | 425/409 X |
| 3,635,629 | 1/1972 | Saladin ........................... | 425/409 X |
| 3,765,785 | 10/1973 | Humphreys et al. ............. | 425/292 X |

Primary Examiner—Robert L. Spicer, Jr.
Attorney, Agent, or Firm—Michael S. Striker

[57] ABSTRACT

A multi-part molding press is described for the manufacture of an article having a selected three-dimensional shape. The article is formed at least in part of a shaping layer consisting of a synthetic resin material and another layer consisting of a fabric. The molding press comprises separate press parts shaped to provide the article with its selected three-dimensional form and arranged to be pressed together to exert a pressing force directly on the layers forming the article. At least one of said press parts is arranged to provide a base part on which the layers to be formed into the article are placed. At least one other of said press parts comprises a plurality of interconnected rod-like members forming a lattice-shaped press part with lattice openings between said rod-like members through which the layer adjacent to said lattice-shaped press part can be observed when said press parts are moved together, whereby any misalignment of the layer can be corrected. Said rod-like members are arranged to exert narrow bands of pressure application to the layers for joining the layers forming the article along the narrow bands. Said rod-like members are designed to carry additional parts of said press. Said additional parts of the press are adapted to influence and control the shape of said articles having a selected three-dimensional shape.

20 Claims, 9 Drawing Figures

MULTI-PART MOLDING PRESS

In known processes and apparatus for manufacturing textile products having a predetermined, permanent three-dimensional shape and comprising a pile covering and at least one layer which consists of or contains thermoplastic and/or thermosetting plastics materials, portions which determine the three-dimensional textile products are simultaneously subjected to a mechanical pressure applied to such portions in conjunction with a continuous visual observation of textile product portions which are disposed between and adjoin said portions which determine the three-dimensional shape. When pieces of textile fabric have been cut and assembled to form a common workpiece, this can be accomplished in that the workpiece is subjected to the pressure only in its connecting portions which determine the three-dimensional shape of the workpiece so that this pressure causes the pieces of textile fabric to be joined in the connecting portions, particularly by welding, and these pieces are moved to and retained in positions in which they form surfaces which together result in the desired three-dimensional shape of the final workpiece. Alternatively, a single blank forming the entire workpiece may be subjected to a pressure only in those portions which determine the three-dimensional shape of the workpiece so that the process does not and need not result in joints between pieces because only a single blank is used.

By this process, coverings for the floor, side walls and ceilings of motor vehicles, airplane cabins and cockpits, and other textile products can be made quickly and in a highly economic manner because only the above-mentioned short pressing operation is required to make the above-mentioned three-dimensional textile products, which previously had to be assembled and joined from different blanks by troublesome manual work unless they were made by shaping a single piece of textile fabric with a very high labor expenditure. Considerable work was required to join the pieces, e.g., by sewing, adhering, welding, or the like, and this work was not reduced if the blanks were impregnated with synthetic resin and the latter was used in joining the blanks by heat sealing. There was the additional disadvantage that the need for manual work prevented the manufacture of identical workpieces so that the latter had to be subjected to time-consuming and uneconomical, subsequent manual operations. In addition, whereas the use of manual labor alone enabled the provision of three-dimensional shapes by cutting and joining operations alone, such operations could not be performed for a permanent deformation within the individual blanks so that fairly small blanks requiring considerable joining work had to be used to give the desired result.

Based on this state of the art, the present invention is based on the further recognition that the manufacture of final products from the above-mentioned blanks involves the performance of operations in addition to those required to impart the required three-dimensional shape to the workpiece. Such additional operations consist, e.g., in the formation of apertures in the textile fabric in order to provide passages for linkage members used, e.g., to connect a brake pedal to other parts of the brake system, or for shift levers which lead to the transmission, for the throttle associated with the carburetor and for the accelerator pedal which is connected to said throttle by a linkage, for the heads of foot-operated switches for changing from town light to long-distance light or for signalling, for connecting conduits and cables between instruments and units which are to be supervised, for cranks for positioning the side windows, for electric lines leading to ceiling lights, loudspeakers, pipelines for heaters etc. In addition to the punching and cutting operations required to form the apertures, embossing, incising, folding and the like tools must sometimes be used to make the final textile product. In other cases the textile product must be cut to provide the edge configuration which is required for bordering said textile product at these edges with strips which at right angles to the surfaces defining the edges have additional surfaces which must be flush with the surface of the textile product so that the desired appearance is obtained. Such an exact bordering cannot be ensured only if the textile product is accurately cut accordingly before the pressing operation because in dependence on the materials which are available this pressing operation does not give only desired changes but also undesired, disturbing changes. The latter may reside, e.g., in that the textile product is stretched or shrinks in an uncontrolled manner under the influence of the pressure applied and in dependence on the nature of the synthetic resin which is used.

Based on the additional object which has thus been recognized, the present invention is based on the further recognition that all or part of the additional operations required to make the final product can be performed in the known process described first hereinbefore by the movement which results in the application of the pressure.

In view of these recognitions, the invention relates to apparatus for producing textile products having a predetermined, permanent three-dimensional shape in a process in which the movement performed to aply the pressure is used to perform additional operations required to make the final product, such as cutting, trimming, and punching and/or manufacturing operations carried out at suitable elevated temperatures, such as heat severing, sealing, welding etc. Specifically, the temperature rise which results from the combustion of edge portions protruding from the usable part of the textile product can be utilized to heat the edge of the usable area at least to plasticize the synthetic resin. Because the temperature can readily be controlled in this step, the undesired protruding portions of the textile fabric are cut off and discarded and the edge of the textile fabric is sealed so that a subsequent unravelling thereof is precluded at least to a large extent.

The present invention is also based on the further recognition that among the heat severing processes the use of a Bunsen flame gives special results, which cannot be produced, e.g., by electric heaters. As the pressure is applied, a direct contact between the textile fabric and heater body is inevitable. It has been found in extensive tests that there are no resistance wires which could resist for the duration the simultaneously occurring thermal and mechanical stresses. On the other hand, the Bunsen flame can heat the textile fabric to the temperatures required for heat severing, oxidizing, carbonizing, etc. of superfluous portions of the textile fabric even in the area in which the mechanical stresses occur so that this would be the only way so to perform the process and design the apparatus that they can be used on the long run.

The apparatus according to the invention comprises a forming press having press-forming platens which are moved toward each other to apply pressure to the workpiece and are moved apart to release the workpiece, and for carrying out the process, one of said press-forming platens carries a rod or tube structure consisting of a grate or grid or basket. In contact with the textile fabric, the rods subject those portions of the textile to pressures which determine the three-dimensional shape thereof e.g., to deform heat-plasticized thermoplastic synthetic resin together with the textile fabric so as to provide the required three-dimensional shape. If the grates, grids or baskets consist of tubes rather than rods, the same can be connected to sources of heating or cooling fluid so that they cannot only take up said pressure but can transform the synthetic resin content of the textile fabric into the desired condition or can cool the same to transform said resin from said condition so that the resin is cured and stabilized in its three-dimensional shape. These rods or tubes have been proposed before and in view of further recognitions underlying the present invention can be used to hold the tools, implements, and/or other devices in the positions which are required to perform all or part of the operations which serve to manufacture the final product.

In accordance with this further recognition, apparatus according to the invention for carrying out the above-mentioned processes are characterized in that the rods or tubes of a press-forming platen are designed to carry punching, blanking, embossing, incising, folding, welding tools, glow wires, beam, roller, high-frequency electrodes and other tools, implements and devices; the above-mentioned Bunsen burners are preferred as stated. If the anvil formed by a press-forming platen which is disposed opposite to the press-forming platen which consists of a grate, grid or basket is provided with means for discharging workpiece waste, such waste can be eliminated even when it is entirely surrounded by other textile fabric portions. This will avoid a loss of time which would otherwise be incurred if the operations would have to be interrupted so that the machine can be cleaned and disturbing waste can be removed therefrom. In a simple case these means consist of apertures in said anvils so that waste pieces, e.g., punched-out pieces, can simply be removed by being forced through these apertures.

The accompanying drawings show by way of example embodiments of such apparatus.

Figure 1:
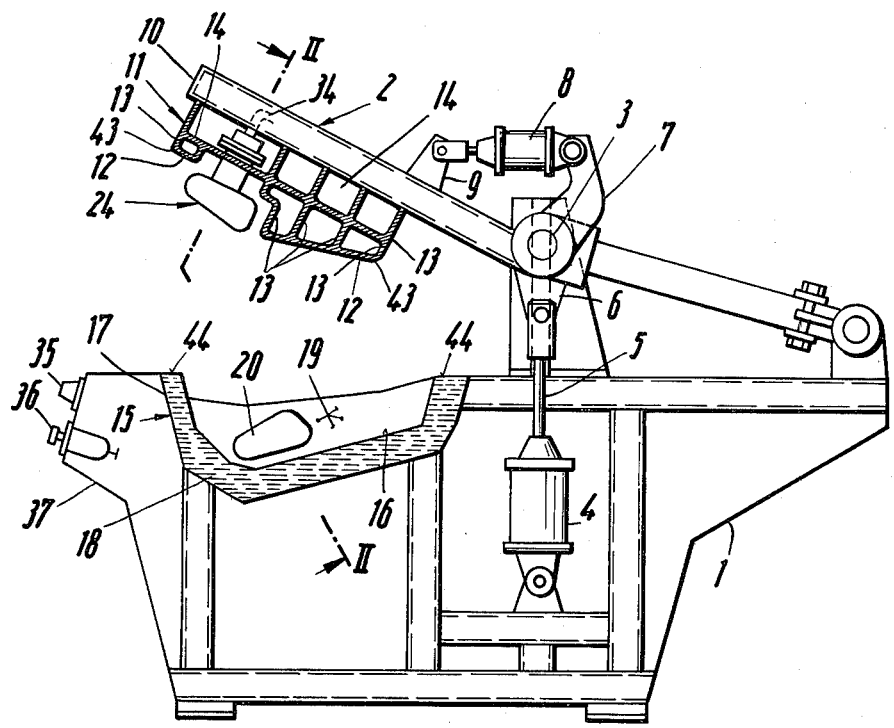
FIG. 1 is a vertical longitudinal sectional view showing a machine which comprises two press-forming platens in a position in which the machine is ready to receive a workpiece to be treated.

In the embodiments shown in the drawings, the base of the machine forms a stationary press-forming platen 1 and the machine further comprises a movable press-forming platen 2, which is pivoted on an axle 3. Power for performing the pressing operation is delivered by a drive unit, which comprises a cylinder 4, a piston (not shown), which is guided in said cylinder, a push rod 5, a double crank 6, 7, a damping spring member 8, and an adjusting strap 9. To simplify the drawing, the crank 6 is shown in a position in which it is an extension of and aligned with the push rod 5. Known measures, not shown, have been adopted to prevent such a position of the parts, in which these would be self-locking. The adjusting strap 9 is carried by a frame member 10, to which the rod or tube assembly 11 is secured. This assembly comprises rods or tubes 12 for applying pressure to the workpiece and additional rods or tubes 13, 14 which form a compression-resisting lattice structure. Specifically, the rods or tubes 12 are arranged so that their bottom generatrices coincide with those lines at which the workpiece to be formed, which is not shown, is subjected to the largest deformation when the movable press-forming platen 2 is in the position in which the highest pressure is applied to the workpiece. Those surface portions of the rod and/or tube structure 11 which adjoin the bottom generatrices also act on the workpiece to press and shape the same when the press-forming platen 2 is in its working position so that those profiled surfaces which face the stationary press-forming die 15 are a replica of that surface profile which is to be imparted to the workpiece.

The above-mentioned stationary press-forming die of the base-forming press-forming platen 1 of the machine is double-walled and the surface profile of the inside wall 16 which faces the movable press-forming platen 2 is also a replica of the workpiece to be manufactured. The inside wall 16 is supported and surrounded by the outside wall 17. It is not essential to provide supporting means between the walls 16, 17, which may constitute a single solid wall 16, 17. In the embodiment shown by way of example, the walls 16, 17 define between them a space which is filled with a liquid 18. Because liquids are incompressible, the filling 18 acts like a solid wall. Alternatively, the space between the walls 16, 17 can be connected to conduits for supplying or withdrawing heating and/or cooling fluids. It is also possible to use the filling 18 for a supply of chemically active substances; in this case, the inside wall 16 is perforated. The pressure of the filling 18 can be increased or decreased so that these chemical agents have access to the workpiece, or substances to be removed from the workpiece are sucked off. This may be desirable, e.g., if the rod and/or tube structure 11 is not used only to apply pressure but, e.g., also for joining, welding, sealing and other operations, to which blanks of the workpiece must be subjected, e.g., in order to join these blanks in forming a final workpiece. In these operations, gases and/or vapors may be evolved and are suitable sucked off to avoid a nuisance in the environment.

A machine designed as described thus far has been proposed before. According to the invention, the following additional measures are adopted. It is assumed that the workpiece which is to be inserted into the working space 19 and to be shaped in contact with the inside wall 16 of the stationary press-forming die 15 and that the workpiece is to be punched to form an aperture in an area which agrees with the cross-sectional profile of an aperture 20 shown in FIG. 1. The shaping movement of the movable press-forming platen 2 should be utilized also to cut this aperture corresponding the cross-sectional profile of the aperture 20 out of the workpiece. The workpiece is shown in FIG. 2 on a greatly enlarged scale strictly diagrammatically and in section. The two woven fabric layers 21, 22 are apparent, which are impregnated with a thermoplastic synthetic resin. This synthetic resin forms also a covering layer 23 on the woven fabric layers 21, 22.

To accomplish the object underlying the invention, the rod and/or tube structure 11 carries a cutting die 24. The design of said die is apparent from the longitudinal sectional view shown in FIG. 2. As is particularly apparent from FIG. 2, the cross-sectional shape of the die agrees with the cross-sectional shape of the aperture 20 in the stationary press die 15. The die 24 comprises a hollow cutting punch 25, which has a cutting edge 26 facing the workpiece 21, 22, 23. The hollow cutting punch 25 is flanged to a pressure fluid cylinder 27, which contains a piston 28, which is connected by a push rod 30 to the ejector 29. A tension spring 32 is disposed between the ejector 29 and an intermediate disc 31 and retracts the ejector 29 to its initial position. The cylinder 27 is closed by a cylinder cover 33, to which a pressure fluid conduit 34 is connected.

The apparatus which has been described has the following mode of operation.

The control station 37 of the machine is provided with controls 35, 36, which are associated with control means, not shown. The control station also comprises the required measuring instruments. As soon as the controls 35, 36 have been operated to admit pressure fluid to the cylinder 4, the movable press-forming platen 2 is pivotally moved about the axis 3 in the counterclockwise sense. The workpiece 21, 22, 23 has previously been impregnated with the thermoplastic synthetic resin and has been introduced into the working space 19 and contacted with the wall 16. As the pressing operation proceeds, the workpiece in contact with the bottom portions of the rods and/or tubes 12 is press-formed to the desired three-dimensional shape at least in those portions which must be deformed to enable the desired three-dimensional configuration of the workpiece. The die 24 is held by means 38, 39, e.g., on the rods or tubes 14 in such an adjusted position that the cutting edge 26 of the cutting punch 25 contacts the workpiece 21, 22, 23 at the time at which the bottom surfaces of the rods and/or tubes 12 contact the uppermost layer 21 of the workpiece. Alternatively, the contact between the cutting edge 26 and the workpiece 21, 22, 23 may begin when the workpiece has been compacted to the desired extent or part thereof. If the connection between the holders 38, 39 and a rod or tube 14 is adjustable, as is shown in FIG. 2 for the bellcrank lever 40 and the fixing screw 41, 42, the time at which the cutting edge 26 of the cutting punch 25 can punch out that portion of the workpiece which is disposed above the cross-section of the aperture 20 can be varied. The portion which has been punched out falls through the aperture 20, independently of the further movements, and may be discarded as waste. Because such punching operations result in the formation of connecting bridges consisting of fibers or the like which have not been severed, the ejector plate 29 is provided. As soon as the pressure fluid supplied through conduit 34 causes the piston to descend when the punching operation has been performed, the ejectdor 29 severs the last bridges to that the punched-out portion of the workpiece is torn from the remaining portion of the workpiece and is reliably removed. The outline of the ejector 29 agrees with that of the aperture 20. The tension spring 32 has been stressed during the ejecting operation and returns the ejector plate 29 to its initial position as soon as the control means have relieved the conduit 34 of the fluid pressure.

Figure 5:
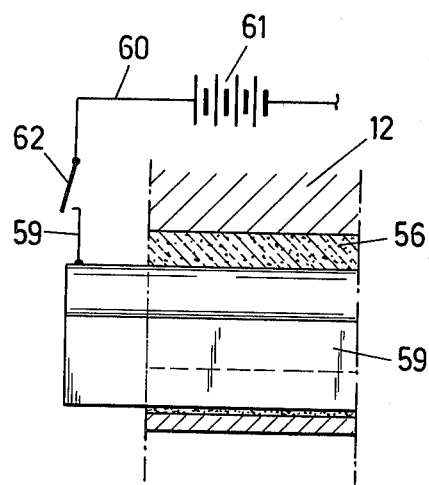
Figure 6:
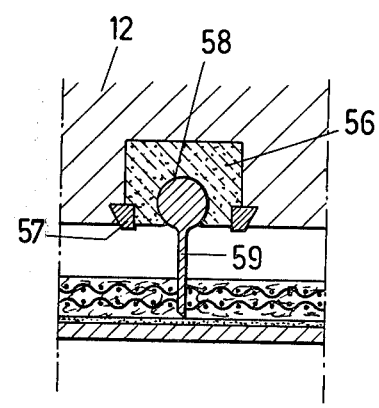

The remarks made in connection with the punching tool 25, 26 are logically applicable to any other tool. For instance, glow wire members 59 could be inserted at the edges 43 in FIG. 1, where the shaping rods or tubes 12 join the outer supporting rods or tubes 13, and in those edge portions which are disposed between the joints. These glow wire members 59 as shown in FIGS. 5 and 6 mounted with portion 58 in conventional insulation 56 and can be energized by a source of electrical energy 61 as soon as the deformation of the workpiece 21, 22, 23 has been completed. As a result, projecting portions of the workpiece which are disposed outside of the glow wires will be removed from the finished workpiece and will also be removed. For this purpose, the control stand 37 comprises a push-button switch 62 for an arbitrary operation, or a time-limit relay for automatically energizing or deenergizing the glow wire members at or before or after the completion of the deformation of the workpiece. When the movable press-forming platen 2 has been raised, that portion of the workpiece which has been left after the protruding portions have been burnt off lies on the edge portion 44 of the stationary press-forming die 15. An automatically applied pulse of compressed air serves to remove the edge portion which has been severed. This procedure has the advantage that the workpiece is also sealed or welded at its edges because the glow wire can have such a configuration and be heated to such a temperature that the edge is thus sealed or welded. This does not exhaust the possibilities which may be adopted. The process may be used to perform any operation which serves to manufacture the final workpiece.

When it has been stated above that the tools, tool-like means, and devices provided in addition to the press-forming dies are connected to the rods or tubes of the movable press-forming platen, this means that a frame which holds the rods or tubes is also considered as a rod or tube for this purpose. Besides, it is not essential that the rod and/or tube assembly belongs to the movable press-forming platen. The same technical effect could be produced if that arrangement is kinematically inverted so that the rods and/or tubes are secured to the stationary press-forming platen whereas the anvil for supporting the workpiece is carried by the movable press-forming platen. Generally, the embodiment which has been described and shown on the drawings by way of example by no means restricts the forms in which the invention can be embodied. For instance, the operations which are generally performed at elevated temperatures could be replaced by operations which can be performed with the same result at lower temperatures, such as joining with cold-setting adhesives, cold welding, cold sealing or the like.

Figure 2:
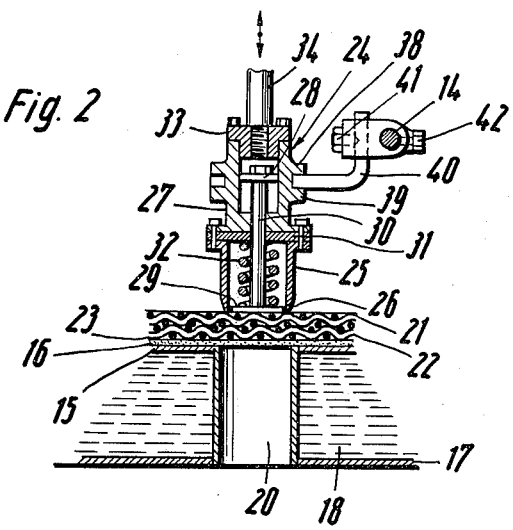
FIG. 2 is a transverse sectional view showing movable and stationary press-forming platens in a position in which the movable platen has been moved from the position shown in FIG. 1 and has just contacted the workpiece.
Figure 3:
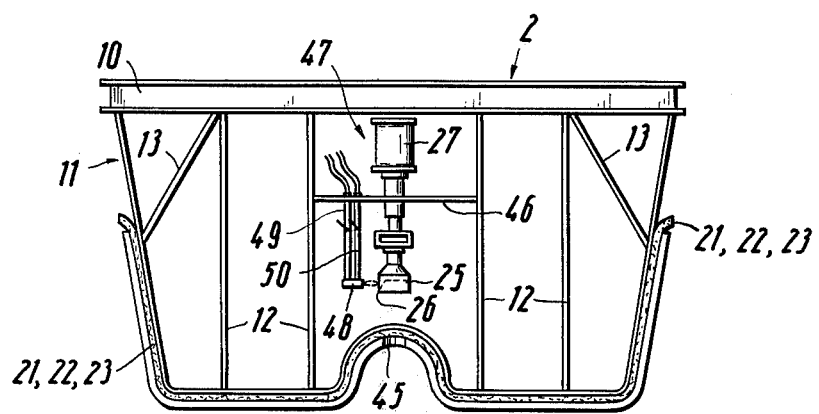
FIG. 3 shows a machine designed for use with gas-air burners.

Such a modification of the embodiments shown by way of example in FIGS. 1 and 2 is shown in FIG. 3. As has been described in conjunction with FIG. 2, in the embodiment shown therein the workpiece 21, 22, 23 is formed with punched apertures, and in the embodiment shown in FIG. 1 resistance wires accommodated in the surfaces 44 are energized to incandescence so that undesired protruding edge portions of the textile product 21, 22, 23 can be heat-severed. The heat-severing tool in the embodiment shown in FIG. 3 is heated by a Bunsen burner to the required temperature. FIG. 3 is a sectional view showing the movable press-forming platen 2 and is taken in a plane which is at right angles to the plane on which the sectional view of FIG. 1 is taken so that the punch platen 2 of FIG. 1 is shown in a transverse sectional view. The punch platen 2 cooperates with the die platen or stationary press-forming platen of FIG. 1. Like reference numbers designate the same parts as in FIG. 1. The heating of all heat severing tools by means other than resistance heating affords the basic advantage that such heating will not be affected by the considerable vibrations which result from the pressing operation, particularly if the press must operate at a high stroke frequency, which is inevitable for economic reasons. Surprisingly, systems comprising resistance wires are unsatisfactory in this respect because the resistance wires at incandescence lose so much strength that resistance elements having a sufficiently long life can only be made from materials which are uneconomical when used in large quantities. These difficulties will be eliminated if the concept shown in FIG. 3 is adopted. These rods 12 which are disposed near a workpiece portion 45 which is to be heat-severed from the workpiece 21, 22, 23 during or after its manufacture carry a crossmember 46, which carries a device which is similar to that shown in FIG. 2. The device generally designated 47 comprises a main cylinder 27, which contains a piston 28 which is not shown in FIG. 3 but apparent from FIG. 2 and which is suitably connected to the hollow cutting punch 25, which terminates in the cutting edge 26. The hollow cutting punch 25 consists of heat-resisting material so that the cutting edge 26 can be heated in continuous operation to temperatures at which those portions of the textile fabric which are contacted with said cutting edge are immediately oxidized or carbonized. The required temperatures are produced by the Bunsen burner 48, which is provided with the conventional conduits 49 and 50 for supplying the fuel gas and the combustion-supporting oxygen or air. The burner need not consist of a Bunsen burner because other burners may be used provided that they can heat the heat severing edge 26 to the required temperatures. If the portion 45 is to be heat-severed during the pressing operation, a control device will be provided, which is not shown on the drawing and which admits the pressure fluid to the piston in the cylinder 27 so soon that the heat severing edge contacts the textile fabric 21, 22, 23 during the compaction thereof, and the further movements of the press-forming platen 2 and the piston in the cylinder 27 are synchronized so that the vertical movements of the heat severing edge 26 and of the punch platen 2 are terminated at the same time. A different adjustment of the control means may be adopted; it is possible first to heat-sever and then to compact, or, as described, to heat-sever and compact at the same time, or to compact first so as to deform the workpiece and subsequently to perform the heat severing operations. The synchronized operation will be preferred for the sake of economy.

As mentioned before, the machine illustrated in FIG. 1 may be modified in various ways, especially by changing the tool means 24 shown in FIG. 1 to different tool means and the rods tubes of the press-forming platen are designed to carry punching, blanking, embossing, incising, folding, welding tools, glow wires, beam, roller, high-frequency electrodes and other tools, and implementing devices.

Figure 4:
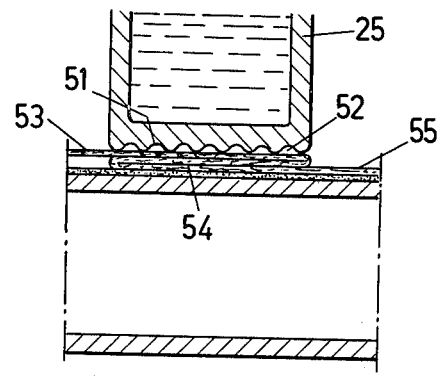
FIGS. 4–9 are partial, partially sectioned views showing modifications of the machine of FIG. 1.

Thus, instead of the cutting tool shown in FIG. 2, an embossing tool 25', as shown in FIG. 4 may be mounted on the frame 10 in a manner similar to the mounting of the cutting punch 25 as shown in FIG. 2. The embossing tool 25' only partially shown in FIG. 4 has a bottom wall 51 which is provided with an embossing profile 52. When the embossing tool is moved into engagement with the workpiece, as described above in connection with FIGS. 1 and 2, the profile 52 will be impressed on the workpiece 53, 54 and 55 to emboss the latter.

Figure 7:
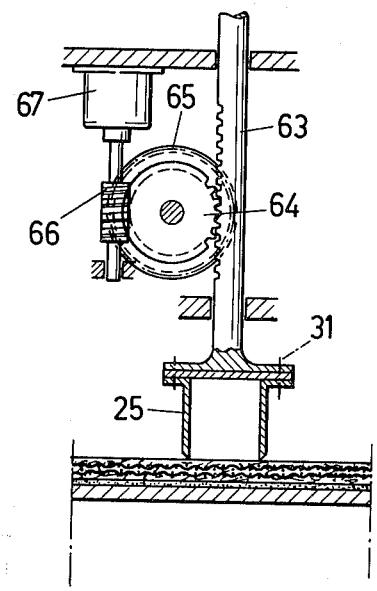

Instead of mounting the cutting tool as shown in FIGS. 1 and 2 on the frame for movement therewith, the cutting tool 25 may also be provided with an independent motor drive. In FIG. 3 above described the independent motor drive is shown as fluid operated cylinder and piston means 47, whereas FIG. 7 illustrates another conventional motor drive for the cutting tool 25. As shown in FIG. 7, the cutting tool 25 is connected by screws to the plate-shaped bottom of an elongated rack member 63 mounted in the frame of the machine for reciprocating motion. The rack 63 meshes with a gear 64, and coaxially with the gear 64 a worm gear 65 is arranged for movement therewith which meshes with a worm 66 driven by an electric motor 67 mounted on the frame.

Figure 8:
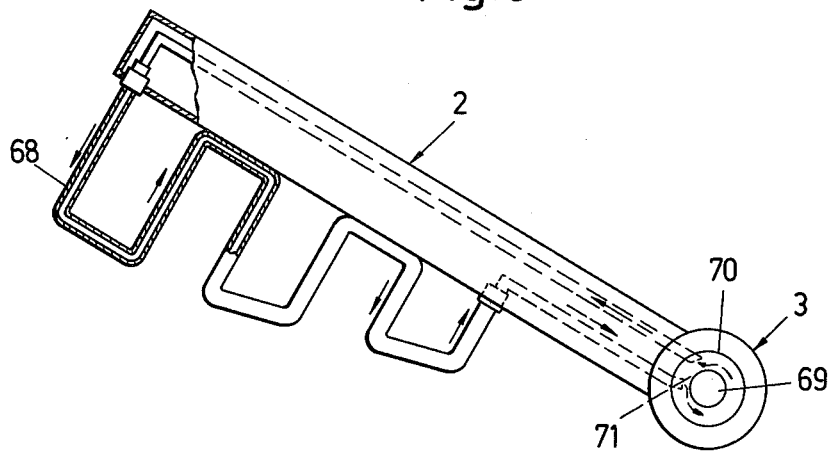

FIG. 8 illustrates a further modification in which the frame of the machine carries instead of solid rod-like members 12 an assembly of tubular members 68, and wherein the pivot 3 of the frame is hollow and comprises coaxial tubes 70 and 69, and in which each tubular member 68 communicates at one end with a space between the tubes 69 and 70, whereas the other end of each tubular member 68 communicates through a tube in the frame with the interior of the central tube 69 in said pivot. In this way a fluid may be circulated through the tubular member 68 in the manner as indicated by the arrows in FIG. 8.

Figure 9:
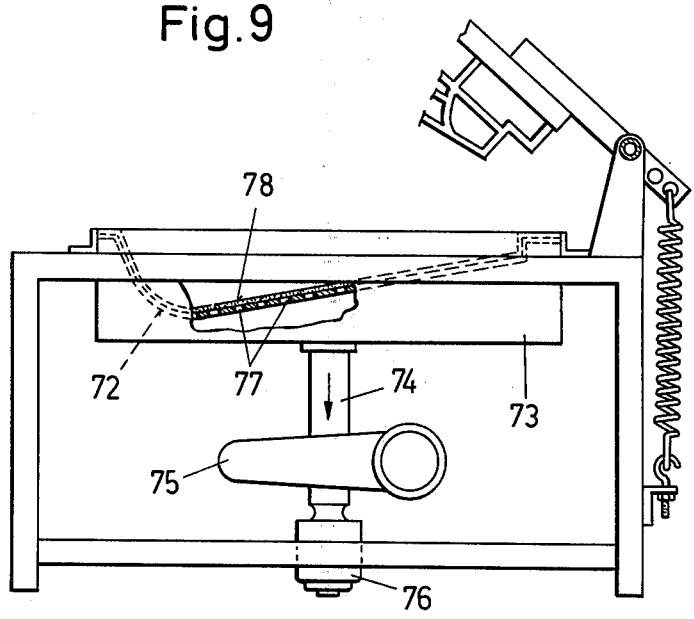

FIG. 9 shows a further modification of the machine as shown in FIG. 1, in which the matrix or a stationary part 72 of the machine is provided with a plurality of perforations 77 and is enclosed at the bottom face thereof by a suction chamber 73 connected by a suction conduit 74 to a ventilator or suction pump 75 driven by an electric motor 76. When a workpiece 78 is placed over the matrix 72, the workpiece will be suctioned, during operation of the suction pump 75, be sucked onto the upper surface of the matrix 72 to take the configuration of the latter.

The invention covers individual ones of the features which have been described hereinbefore as well as the combination of all these features and all combinations of parts of the features inasmuch as such partial combinations are technically useful and practicable, even though the novel technical results which are produced in each case have not been mentioned or specifically described. All other details shown on the drawing are considered as described as such and in their functional relation.

What is claimed is:

1. A multi-part molding press for the manufacture of an article of selected three-dimensional shape formed at least in part of a shaping layer consisting of a synthetic resin material and another layer consisting of a fabric, said molding press comprising separate press parts shaped to provide the article with its selected three-dimensional form and arranged to be pressed together to exert a pressing force directly on the layers forming the article, at least one of said press parts arranged to provide a base part on which the layers to be formed into the article are placed, at least one other of said press parts comprising a plurality of interconnected rod-like members forming a lattice with openings between said rod-like members through which the layer adjacent said other press part can be observed when said press parts are moved together whereby any misalignment of the layer can be corrected, said rod-like members being arranged to exert narrow bands of pressure to the layers for joining the layers forming the article along the narrow bands; and tool means carried by said rod-like members visible through the opening therebetween for performing additional operations on said layers.

2. A multi-part molding press as set forth in claim 1 in which said tool means comprises a punch having an annular cutting edge and a motor drive carried by said other press part for moving said punch relative thereto, said base part of said molding press being provided with a die opening aligned with and corresponding in shape to said annular cutting edge of said punch.

3. A multi-part molding press as set forth in claim 1, in which said tool means comprise a combined heat severing and punching tool having a cutting edge, a motor drive carried by said other press part for moving said combined heat severing and punching tool relative there-to, and means for heating said cutting edge of said tool.

4. A multi-part molding press as set forth in claim 1, in which said means for heating said cutting edge comprise gas burners.

5. A multi-part molding press as set forth in claim 1, in which said tool means comprise cutting tools.

6. A multi-part molding press as set forth in claim 1, in which said tools comprise punching tool means.

7. A multi-part molding press as set forth in claim 1, in which said tools comprise embossing tool means.

8. A multi-part molding press as set forth in claim 1, in which said tools comprise incising tool means.

9. A multi-part molding press as set forth in claim 1, in which said tool means comprise tools for thermally changing the fabric.

10. A multi-part molding press as set forth in claim 1, in which said tool means comprise heat-severing tools adapted to heat-sever portions of the fabric.

11. A multi-part molding press as set forth in claim 1, in which said tool means comprise glow wires adapted to heat-sever portions of said fabric in contact with said glow wires.

12. A multi-part molding press as set forth in claim 1, in which said tool means comprise welding tools.

13. A multi-part molding press as set forth in claim 1, in which said tool means comprise electrodes adapted at least to heat portions of the fabric in contact therewith.

14. A multi-part molding press as set forth in claim 1, in which said tool means comprise tools having an independent motor drive.

15. A multi-part molding press as set forth in claim 1, in which said rod-like members are formed of solid bars.

16. A multi-part molding press as set forth in claim 1, in which said rod-like members are tubular in form with the passages therein interconnected for circulating a liquid therethrough.

17. A multi-part molding press as set forth in claim 1, in which
 a hollow pivot member is arranged for pivotally mounting said other one of said press parts so that said other one of said press parts can be pivotally displaced relative to the one of said press parts forming the base part, and
 said tubular rod-like members are in fluid communication with said hollow pivot member for circulating a fluid from said pivot member through said rod-like members.

18. A multi-part molding press as set forth in claim 1, in which said interconnected rod-like members have a three-dimensional shape arranged to mate with and correspond to the shape of said press part forming the base part.

19. A multi-part molding press as set forth in claim 1, in which
 the layers to be formed into the article are composed of a multiple number of individual layer parts each defining a different curved or flat plane surface of the article,
 the other one of said press parts having its rod-like members disposed along at least the joints between the different plane surfaces of the article formed by the individual layer parts.

20. A multi-part molding press as set forth in claim 1, in which
 wall means in combination with the one of said press parts providing the base part forming a closed chamber subjacently arranged to the one of said press parts,
 the one of said press parts has a plurality of perforations therethrough communicating with the closed chamber, and
 means are connected to said closed chamber for establishing a suction therein acting through the perforations in the one of said press parts on the layers placed on the one of said press parts.

* * * * *